US009043423B2

(12) United States Patent
Mansfield et al.

(10) Patent No.: US 9,043,423 B2
(45) Date of Patent: May 26, 2015

(54) PERPETUAL MEMOIRE

(71) Applicant: Forget You Not, LLC, Waban, MA (US)

(72) Inventors: Richard J. W. Mansfield, Cambridge, MA (US); Nissim Shani, Waban, MA (US); Daniel Shani, Waban, MA (US)

(73) Assignee: Forget You Not, LLC, Waban, MA (US)

( * ) Notice: Subject to any disclaimer, the term of this patent is extended or adjusted under 35 U.S.C. 154(b) by 0 days.

(21) Appl. No.: 13/866,748

(22) Filed: Apr. 19, 2013

(65) Prior Publication Data

US 2014/0280634 A1    Sep. 18, 2014

Related U.S. Application Data

(60) Provisional application No. 61/790,789, filed on Mar. 15, 2013.

(51) Int. Cl.
*H04L 12/58* (2006.01)
*H04L 29/08* (2006.01)
*G06Q 10/02* (2012.01)
*G06Q 10/10* (2012.01)

(52) U.S. Cl.
CPC .............. *H04L 51/10* (2013.01); *H04L 67/325* (2013.01); *G06Q 10/02* (2013.01); *H04L 67/18* (2013.01); *G06Q 10/10* (2013.01); *H04L 51/32* (2013.01)

(58) Field of Classification Search
CPC ......... H04L 51/00; H04L 51/20; H04L 51/28; H04L 51/32; H04L 67/18; H04L 67/325; G06Q 10/02; G06Q 10/06; G06Q 10/10; G06Q 50/01

USPC .............. 709/203–206, 217, 224; 706/11, 17; 455/412.1, 466
See application file for complete search history.

(56) References Cited

U.S. PATENT DOCUMENTS

| | | | |
|---|---|---|---|
| 5,634,667 A | 6/1997 | Jordan | |
| 6,324,736 B1 | 12/2001 | Atrio | |
| 6,340,978 B1 * | 1/2002 | Mindrum | 715/733 |
| 7,050,822 B2 * | 5/2006 | Nielsen et al. | 455/466 |
| 7,233,803 B2 * | 6/2007 | Nielsen et al. | 455/466 |
| 7,266,767 B2 | 9/2007 | Parker | |
| 7,480,513 B2 | 1/2009 | Woo | |

(Continued)

FOREIGN PATENT DOCUMENTS

| | | |
|---|---|---|
| JP | 2006-107369 | 4/2006 |
| JP | 2008-234341 | 10/2008 |

(Continued)

OTHER PUBLICATIONS wikipedia, "Natural Language Processing", Accessed Nov. 15, 2013.*

(Continued)

*Primary Examiner* — Ramy M Osman
(74) *Attorney, Agent, or Firm* — Fish & Richardson P.C.

(57) ABSTRACT

Among other things, an intelligent automated proxy for an party who wants to communicate a multimedia message about a life event an integrated, conversational manner using natural language dialog to a second party and provides information from which the life event, the communication, the manner of delivery, the future time, and the recipient can be determined.

55 Claims, 12 Drawing Sheets

(56) References Cited

U.S. PATENT DOCUMENTS

| | | | |
|---|---|---|---|
| 7,499,897 B2 | 3/2009 | Pinto et al. | |
| 7,562,058 B2 | 7/2009 | Pinto et al. | |
| 7,603,292 B1 | 10/2009 | Bragg et al. | |
| 7,680,882 B2 | 3/2010 | Tiu, Jr. et al. | |
| 7,725,300 B2 | 5/2010 | Pinto et al. | |
| 7,730,003 B2 | 6/2010 | Pinto et al. | |
| 7,809,805 B2 | 10/2010 | Stremel et al. | |
| 7,853,656 B2 * | 12/2010 | Yach et al. | 709/206 |
| 7,933,762 B2 | 4/2011 | Pinto et al. | |
| 7,933,810 B2 | 4/2011 | Morgenstern | |
| 7,953,654 B2 | 5/2011 | Abifaker | |
| 7,970,657 B2 | 6/2011 | Morgenstern | |
| 8,037,093 B2 | 10/2011 | Tiu et al. | |
| 8,046,882 B2 | 11/2011 | Rojdev et al. | |
| 8,108,501 B2 | 1/2012 | Birnie et al. | |
| 8,135,624 B1 | 3/2012 | Ramalingam et al. | |
| 8,140,403 B2 | 3/2012 | Ramalingam et al. | |
| 8,165,853 B2 | 4/2012 | Pinto et al. | |
| 8,190,519 B1 | 5/2012 | Angilivelil et al. | |
| 8,234,569 B2 | 7/2012 | Penner | |
| 8,542,606 B2 * | 9/2013 | Yach et al. | 455/412.1 |
| 8,694,633 B2 | 4/2014 | Mansfield et al. | |
| 8,725,823 B2 * | 5/2014 | Mansfield et al. | 709/206 |
| 2002/0019744 A1 * | 2/2002 | Yamamoto | 705/1 |
| 2002/0039113 A1 * | 4/2002 | Kawahara | 709/224 |
| 2002/0072925 A1 * | 6/2002 | Krim | 705/1 |
| 2003/0009461 A1 * | 1/2003 | Notargiacomo et al. | 707/10 |
| 2003/0028498 A1 * | 2/2003 | Hayes-Roth | 706/17 |
| 2003/0158855 A1 | 8/2003 | Farnham et al. | |
| 2003/0217120 A1 * | 11/2003 | Hickey et al. | 709/219 |
| 2004/0001575 A1 * | 1/2004 | Tang | 379/88.04 |
| 2004/0078283 A1 | 4/2004 | Gary | |
| 2004/0203949 A1 * | 10/2004 | Nielsen et al. | 455/466 |
| 2005/0154706 A1 | 7/2005 | Notargiacomo et al. | |
| 2005/0234762 A1 | 10/2005 | Pinto et al. | |
| 2005/0262212 A1 | 11/2005 | Arslan et al. | |
| 2006/0242037 A1 | 10/2006 | Tanimura et al. | |
| 2007/0049289 A1 | 3/2007 | Woo | |
| 2007/0282959 A1 | 12/2007 | Stern | |
| 2007/0294304 A1 | 12/2007 | Bassett et al. | |
| 2008/0005666 A1 | 1/2008 | Sefton et al. | |
| 2008/0089489 A1 | 4/2008 | Katkam et al. | |
| 2008/0102856 A1 | 5/2008 | Fortescue et al. | |
| 2008/0115196 A1 | 5/2008 | Michel et al. | |
| 2008/0147430 A1 | 6/2008 | Hawthorne | |
| 2008/0189188 A1 | 8/2008 | Morgenstern | |
| 2008/0201924 A2 | 8/2008 | Sinclair | |
| 2008/0228887 A1 | 9/2008 | Robertson et al. | |
| 2008/0255988 A1 | 10/2008 | Maltese | |
| 2009/0055482 A1 | 2/2009 | Zhang et al. | |
| 2009/0125410 A1 | 5/2009 | Perlman | |
| 2009/0165090 A1 | 6/2009 | Glasgow | |
| 2009/0197681 A1 | 8/2009 | Krishnamoorthy et al. | |
| 2009/0216691 A1 * | 8/2009 | Borzestowski et al. | 706/11 |
| 2009/0233618 A1 | 9/2009 | Bai et al. | |
| 2009/0265382 A1 * | 10/2009 | Freiman et al. | 709/206 |
| 2009/0271486 A1 | 10/2009 | Ligh et al. | |
| 2009/0276284 A1 | 11/2009 | Yost | |
| 2009/0311992 A1 | 12/2009 | Jagetiya | |
| 2009/0327129 A1 | 12/2009 | Collas et al. | |
| 2010/0169160 A1 | 7/2010 | Wu et al. | |
| 2010/0223341 A1 | 9/2010 | Manolescu et al. | |
| 2010/0262449 A1 | 10/2010 | Monteforte et al. | |
| 2010/0323715 A1 | 12/2010 | Winters | |
| 2011/0022602 A1 | 1/2011 | Luo et al. | |
| 2011/0035260 A1 | 2/2011 | Nielsen et al. | |
| 2011/0047229 A1 | 2/2011 | Sinha et al. | |
| 2011/0071956 A1 | 3/2011 | Pinto et al. | |
| 2011/0078173 A1 | 3/2011 | Seligmann et al. | |
| 2011/0081007 A1 | 4/2011 | Bar-Yoav | |
| 2011/0099048 A1 | 4/2011 | Weiss et al. | |
| 2011/0168828 A1 | 7/2011 | Mori | |
| 2011/0238474 A1 | 9/2011 | Carr et al. | |
| 2011/0238755 A1 | 9/2011 | Khan et al. | |
| 2011/0313946 A1 | 12/2011 | Browne et al. | |
| 2011/0314104 A1 * | 12/2011 | Gray | 709/205 |
| 2012/0016678 A1 | 1/2012 | Gruber et al. | |
| 2012/0150740 A1 | 6/2012 | Isaacson et al. | |
| 2012/0245944 A1 | 9/2012 | Gruber | |
| 2012/0294613 A1 | 11/2012 | Hood et al. | |
| 2012/0315876 A1 | 12/2012 | Srinivasan | |
| 2013/0029308 A1 * | 1/2013 | Graesser et al. | 434/327 |
| 2013/0041740 A1 | 2/2013 | Tyler et al. | |
| 2013/0046826 A1 | 2/2013 | Stanton | |
| 2013/0080532 A1 * | 3/2013 | Stewart | 709/204 |
| 2013/0166607 A1 | 6/2013 | Turk et al. | |
| 2013/0246524 A1 | 9/2013 | Berner et al. | |
| 2013/0257876 A1 * | 10/2013 | Davis | 345/473 |
| 2013/0297710 A1 * | 11/2013 | Luber | 709/206 |
| 2013/0325976 A1 * | 12/2013 | Mansfield et al. | 709/206 |
| 2013/0325978 A1 | 12/2013 | Mansfield et al. | |
| 2013/0325979 A1 | 12/2013 | Mansfield et al. | |
| 2014/0136619 A1 * | 5/2014 | Hoberman | 709/204 |
| 2014/0206328 A1 | 7/2014 | Varoglu et al. | |
| 2014/0259038 A1 * | 9/2014 | Belyaev et al. | 725/14 |

FOREIGN PATENT DOCUMENTS

| | | |
|---|---|---|
| JP | 2011-101337 | 5/2011 |
| JP | 2003-256560 | 9/2013 |
| WO | WO2013/184793 | 12/2013 |

OTHER PUBLICATIONS

Darren, "New HR Celebration Toolkit—Birthdays, Long Service Awards, Weddings and more . . . ", Voucher Shop, Jul. 23, 2012 (3 pages).

"Donor organ storage machine keeps kidneys fresher, boosts transplant success," Daily Mail Reporter, Jan. 1, 2009, 1 page.

Gillies, Donald, "Causality, Propensity, and Bayesian Networks", 2002 (18 pages).

GiftsOnTime, "Gift Management Simplified", retrieved from Internet on May 14, 2012, www.giftsontime.com, 2012 (1 page).

Lane, Nick, "Mobile geo-location advertising will be a big number in 2015", Mobile Squared, retrieved from the Internet, Feb. 24, 2012 (15 pages).

"McDonald's Debuts New Geolocation Mobile Ad Campaign", Marketing Vox, Jan. 31, 2012 (2 pages).

Owen, Sara, et al., "How Mobile Vouchers are Transforming Mobile Marketing", First Data Corporation, 2011 (9 pages).

The interest of the unbord child (nasciturus), from http://wikistudent.ws/Unisa, 2006, 41 pages.

Todd, Greg, "Using Predictive Analytics to Determine the Best Offer", Information Management, Sep. 22, 2008 (13 pages).

International Search Report and Written Opinion from PCT application No. PCT/US2013/044301 mailed Aug. 21, 2013 (17 pages).

* cited by examiner

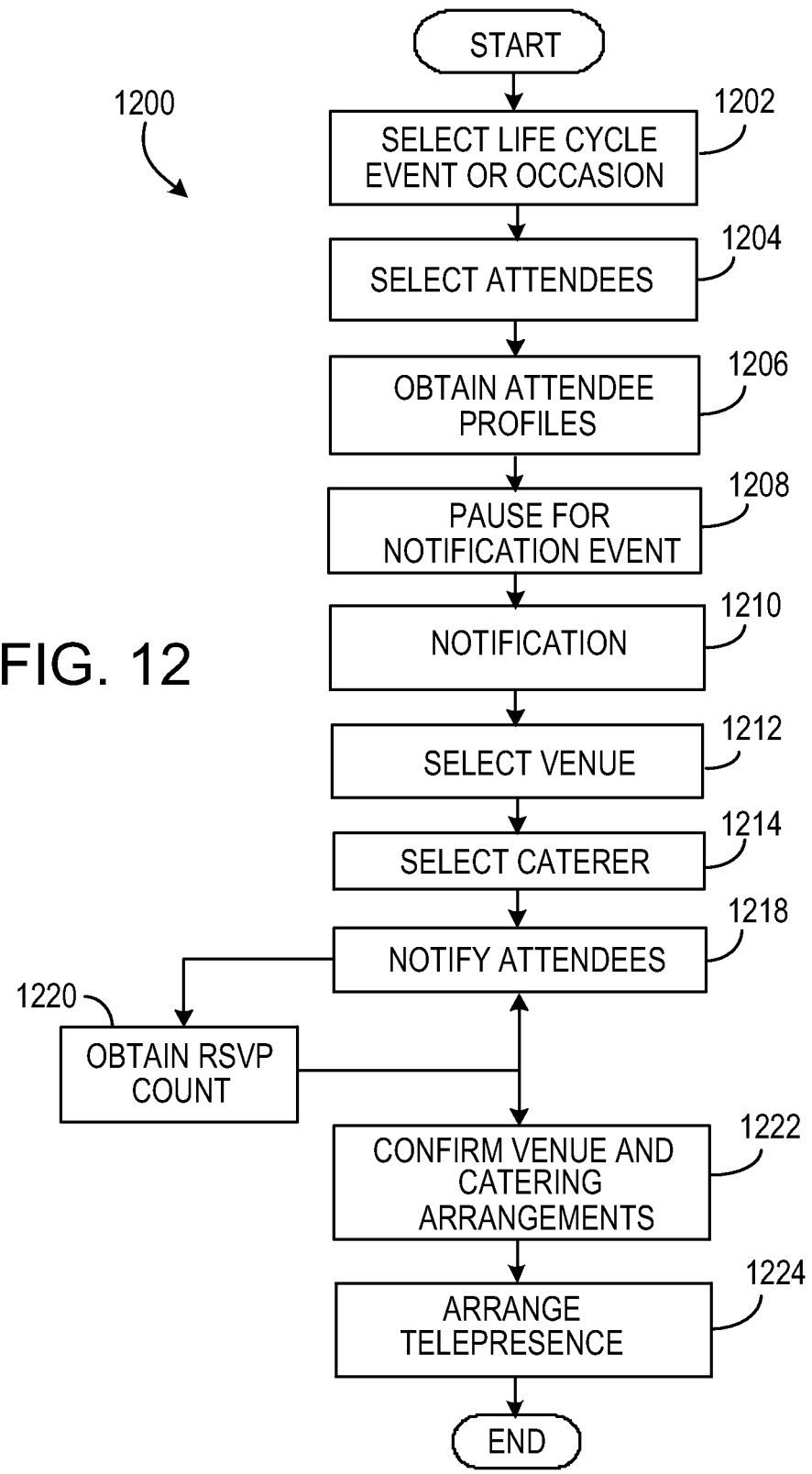

PERPETUAL MEMOIRE

CROSS-REFERENCE TO RELATED APPLICATIONS

This application claims priority to U.S. Provisional Application Ser. No. 61/790,789, filed Mar. 15, 2013, the contents of which are incorporated here by reference.

This application is related to U.S. patent application Ser. No. 13/489,210, filed Jun. 5, 2012; and to U.S. patent application Ser. No. 13/650,941, filed Oct. 12, 2012; and to U.S. patent application Ser. No. 13/715,517, filed Dec. 14, 2012, the entire contents of all three of which are incorporated here by reference.

BACKGROUND

This description relates generally to social network environments, more particularly, to systems and methods for efficient and effective search fin and communication of life history information to present and future generations.

SUMMARY

In general, in an aspect, a method includes maintaining first information characterizing a person; receiving second information indicative of contents of a message to be delivered to a recipient on behalf of the person, an identity of the recipient, and a delivery time for delivery of the message; and delivering the message to the recipient at the delivery time, including conducting a natural language interaction with the recipient on behalf of the person based on the first information characterizing the person.

Implementations may include one or a combination of any two or more of the following features.

The message includes a multimedia message.

Delivering the message includes delivering the message using a digital representation of the person. The method includes generating the digital representation of the person based on the first information characterizing the person. The digital representation of the person includes a representation of one or more of the following: a voice of the person, a behavior of the person, and an appearance of the person.

Conducting a natural language interaction includes responding to a question or statement from the recipient. Responding to the question or statement from the recipient includes responding to the question or statement with a natural language response. The method includes forming a response to the question or statement based on the first information characterizing the person.

The method includes generating the message based on the first information, the second information, or both.

The second information includes a specification of the identity of the recipient.

The second information includes a specification of a relationship between the person and the recipient.

The method includes identifying the recipient based on the second information indicative of the identity of the recipient.

The second information includes a specification of the delivery time.

The second information indicative of the delivery time includes an identification of an event. The second information indicative of the delivery time includes a definition of a condition for occurrence of the event.

The method includes identifying the delivery time based on the second information indicative of the delivery time.

The second information includes a specification of the contents of the message.

The method includes determining the contents of the message based on the second information indicative of the contents of the message.

The contents of the message include autobiographical information about the person.

The second information is indicative of a manner of delivery of the message.

The person is not alive or not competent at the time when the message is delivered.

The recipient is not alive or not competent at the time when the second information is received.

The method includes receiving at least some of the first information characterizing the person from the person. Receiving the first information comprises: presenting a question to the person and receiving an answer to the question from the person. Receiving the first information includes conducting a natural language interaction with the person.

The method includes obtaining at least some of the first information characterizing the person from an automated analysis of publicly available online information.

The first information characterizing the person includes information about one or more of the following: a voice of the person, a behavior of the person, and an appearance of the person.

The first information characterizing the person includes information about a time period during which the person lived.

The first information characterizing the person includes autobiographical information about the person.

In general, in an aspect, a method includes receiving first information characterizing a person and second information indicative of an identity of a recipient and conducting a natural language interaction with the recipient using a digital representation of the person that is generated based on the first information, in which the person is not alive or not competent when the natural language interaction is conducted.

Implementations may include one or a combination of any two or more of the following features.

Conducting the natural language interaction includes conducting the natural language interaction based on the first information.

The method includes determining a context of the natural language interaction based on the first information. The context of the natural language interaction includes a time at which the natural language interaction is to be conducted, a style of the natural language interaction, or both.

The method includes determining a content of the natural language interaction based on the first information. The content of the natural language interaction includes autobiographical information about the person.

The digital representation of the person includes a representation of one or more of the following: a voice of the person, a behavior of the person, and an appearance of the person.

Conducting the natural language interaction includes responding to the recipient.

The method includes determining a response to the recipient based on the first information.

The method includes identifying the recipient based on the second information.

The recipient is not alive or not competent when the second information is received.

In general, in an aspect, a system includes a storage device for maintaining first information characterizing a person; and an analytics engine for receiving second information indicative of contents of a message to be delivered to a recipient on behalf of the person, an identity of the recipient, and a delivery time for delivery of the message, and delivering the message to the recipient at the delivery time, the analytics engine configured to conduct a natural language interaction with the recipient on behalf of the person based on the first information characterizing the person.

Implementations may include one or a combination of any two or more of the following features.

The analytics engine is configured to generate a digital representation of the person for display on a user interface.

The analytics engine is configured to respond to a question or statement from the recipient with a natural language response.

The system includes a communication engine configured to identify the recipient based on the second information.

In general, in an aspect, a system includes a communication engine for receiving first information characterizing a person and second information indicative of an identity of a recipient; and an analytics engine for conducting a natural language interaction with the recipient using a digital representation of the person that is generate based on the first information. The person is not alive or not competent when the natural language interaction is conducted.

Implementations may include one or a combination of any two or more of the following features.

The analytics engine is configured to generate the digital representation of the person for display on a user interface.

In general, in an aspect, information is received information from which at least one of the following can be derived: content of a message to be delivered from a first party to a second party about a life event, a manner of delivery of the message, a future time when the message is to be delivered, and the recipient of the message. The, on behalf of the first party, an integrated, conversational multimedia message is automatically formed that is to be part of a natural language dialog with the second party.

Implementations may include one or a combination of any two or more of the following features.

The integrated, conversational multimedia message is automatically formed by an intelligent proxy on behalf of the first party.

The integrated, conversational multimedia message is formed to be responsive to natural language communication of the second party. The intelligent proxy enables a user to interact with online services to obtain information related to the message.

The automatic forming of the message includes imbuing a digital surrogate with qualities associated with the first party, the manner of delivery of the message, the time of delivery of the message, or the recipient of the message.

The information is received interactively. The information is received interactively by and interrogation avatar.

The information is received in the form of images, video, voice, or behavioral gestures of the party from whom the messages to be delivered, or combinations of any two or more of them.

The message is formed to provide an answer to a conventionally asked question.

The natural language dialog includes an interactive obituary or a digitized hid history.

In general, in an aspect, digital information is maintained that enables the formation of an interactive digital surrogate of an originating person based on digital audio or video information derived from the originating person. At a time when the originating person is not alive or otherwise not available, the digital surrogate is caused to engage in a natural language dialog with a receiving person who is determined on the basis of information that had been provided by the originating person.

Implementations may include one or a combination of any two or more of the following features.

The context of the natural language dialog is determined based on information that had been provided by the originating person. The context includes the time of the natural language dialog or the style of the natural language dialog.

In general in an aspect an intelligent automated proxy for an individual is implemented on an electronic device, to facilitate user interaction with the individual's life story in an integrated, conversational manner using natural language dialog. In an aspect the intelligent automated proxy is programmed to enable the individual to more effectively engage with local and remote services to obtain information and perform various actions at future times.

These and other aspects, features, implementations, and advantages, and combinations of them, can be expressed as methods, apparatus, systems, components, program products, business methods, and means or steps for performing functions, or combinations of them.

Other features, aspects, implementations, and advantages will become apparent from the description, the drawings, and the claims.

DESCRIPTION

FIG. 12 is a flowchart for managing an event directive.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of the invention.

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

When a single device or article is described, more than one device/article (whether or not they cooperate) may be used in place of a single device/article. Similarly, where more than one device or article is described (whether or not they cooperate), a single device/article may be used in place of the more than one device or article.

Techniques and mechanisms described or reference herein will sometimes be described in singular form for clarity. However, particular embodiments include multiple iterations of a technique or multiple instantiations of a mechanism unless noted otherwise.

The system described here enables members of a community of users on a network to imbue a surrogate, which is matched in digital appearance, voice, and manner, with their personal knowledge, expertise and discernment in order to carry out the user's directives and intent at some predetermined future time. For example, a senior user with access to a social media network to embed his life story in digital format together with a personalized digital avatar to present that life story or portions thereof in response to natural language questions and using an intelligent surrogate to act on the senior's behalf to carry out the senior's directives in the future after the senior dies or becomes incompetent.

Figure 1:
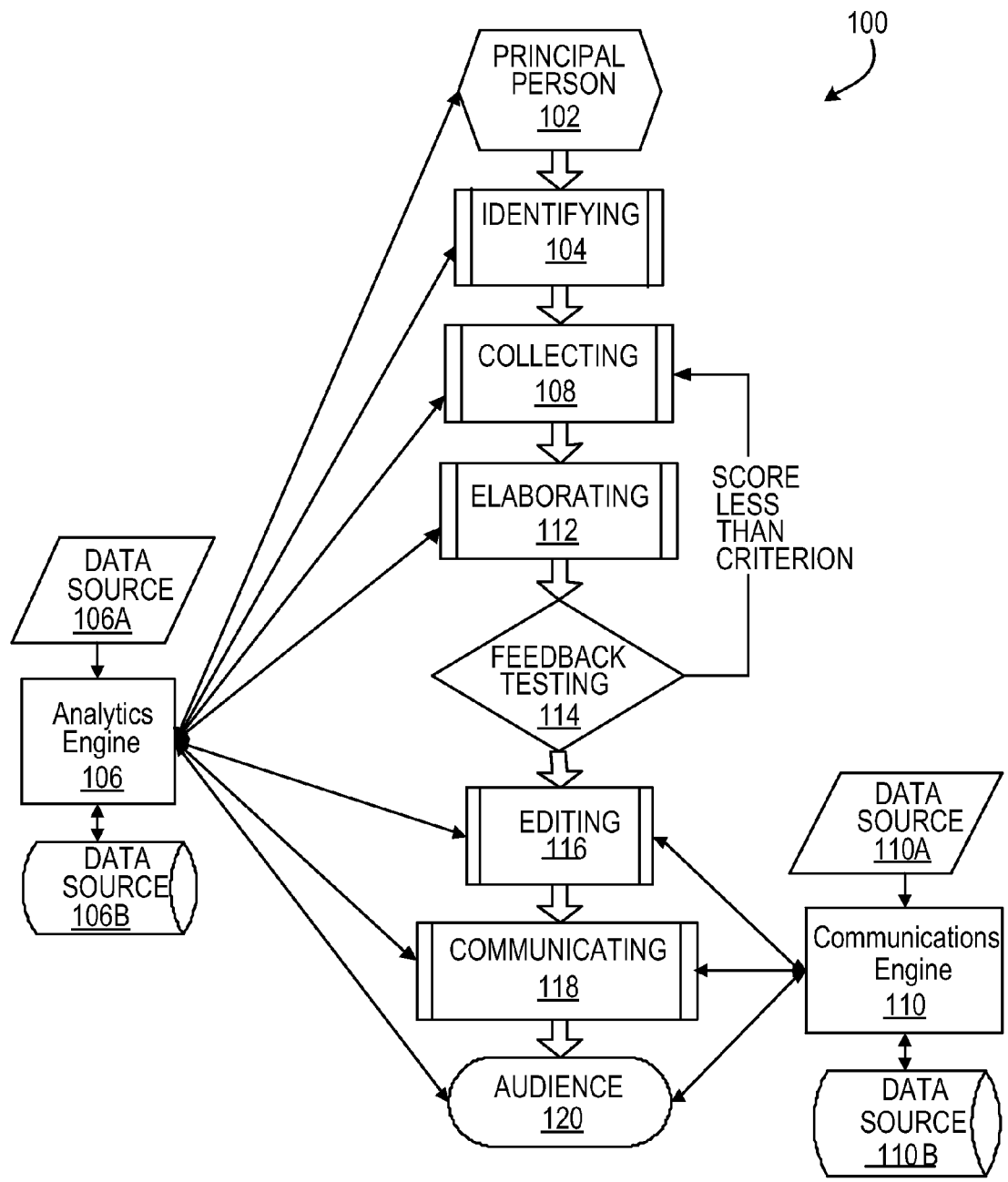
FIG. 1 is a flowchart for developing an intelligent avatar for life history recording, transformation, and publishing in digital interactive format.

FIG. 1 shows the conceptual framework 100 of the interaction of the system with the Principal Person 102 for extracting and transforming a life history. The Principal Person 102 logs onto the system and answers some standard identification questions, 104, so the system aided by the Analytic Engine 106 can search for relevant internet accessible information on the individual and events that occurred during his lifetime found in external data sources 106A or currently in internal data sources 106B. The system then progresses to collecting answers, 108 to autobiographical questions, which cover aspects usually published in a biographical note or obituary article. To assist the Principal Person 102 in answering the questions and to be consistent with the historical record, the system aided by the Analytic Engine 106 assembles material from internal data sources 106B or internet accessible data sources 106A about the Principal Person 102 or the events and presents that informational material along with the questions. The image of the Principal Person 102 along with his verbal answers are collected digitally by the system 108. The system the progresses to more personal, individual questions presented by an Interrogation Avatar during a session of Elaboration 112 with whom the Principal Person 102 is relaxed and comfortable. The Interrogation Avatar, which is generated by the Analytics Engine 106 using techniques similar to those for LivingActor™ and can be selected by gender, age, ethnicity, voice type and other variables, is programmed with natural language understanding similar to that of Apple's SIR1 or Nuance Communications Systems' Nuance Interactive Natural Assistant (Nina™), and exhibit a number of behavioral expressions as do those avatars of LivingActor™ in response to the answers of the Principal Person 102. This Elaboration 112 of autobiographical information then uses a third set of open-ended questions presented by the Interrogation Avatar to elicit life stories, such as those recorded by StoryCorps, covers more personal topics, such as "What is you earliest memory?", "Who was your favorite teacher?" "What is your favorite flavor of ice cream?", "What was it like growing up in [neighborhood, city, region, wartime, depression]? The Elaboration 112 using the Analytic Module 106 can interactively expand upon the questions along the lines of Weizenbaum's ELIZA program but in a more sophisticated manner guiding the Principal Person 102 there a series of life experiences. The responses of the Principal Person 102 are recorded digitally both in terms of voice, and three-dimensional appearance with behavioral gestures.

The system aided by the Analytic Engine 106 then creates a surrogate of the Principal Person 102 consisting of an avatar of the Principal Person 102 linked with the personal knowledge of the Principal Person 102 and the ontology of his world at that point in time. The avatar of the Principal Person is generated using the digitized three-dimensional video image of the Principal Person 102 parsed into behavioral expressions employed to morph the avatar's image, for example, facial expressions of the Principal Person 102 using software such as that of FaceShift.com and employing the Principal Person's voice to generate the avatar's voice in pitch and other sound attributes using articulatory synthesis and a database of speech units, which may amount to a billion or more for responding to arbitrary questions but some life stories or jokes may be recorded and used in their entirety The accuracy of the Surrogate Transformation is assessed 114 by the Principal Person 102 or a Second Person. The Principal Person 102 or a Second Person then interrogates the system's Surrogate of the Principal Person using a script of frequently asked conventional questions. If there are gaps or errors the process iterates until the performance of the Surrogate of the Principal Person reaches a predetermined level of correctness in terms of this limited Turing Test.

As a result of the training and testing, the system enables the Surrogate of the Principal Person 102 to answer general and specific questions by means of an Avatar matching in appearance, voice, manner and gesture the Principal Person 102 and by means of the Analytic Module 106 equipped with a digital representation of the transformed personal knowledge in the form of an ontology covering the lifetime of the Principal Person 102 using the techniques described by Gruber et al. (U.S. patent application Ser. No. 12/987,982, filed Jan. 10, 2011, the contents of which are incorporated herein by reference) to include an automated assistant receiving user input; an active ontology with representations of concepts and relations among concepts drawn from various databases of historical data and a language interpreter parsing the questioner's input to derive a representation of questioner's intent in terms of the active ontology.

Using the Communications Module 110 and the Analytic Module 106 the transformed representation of the Principal Person 102 is edited 116 for particular formats and audiences then communicated 118 when appropriate to that audience 120. So the Surrogate of the Principal Person can be used to generate an interactive obituary, a digitized life history in the Story Corps sense or as a published autobiography using the book assembly techniques of Parker (Philip M. Parker, U.S. Pat. No. 7,266,767 B2, Sep. 4, 2007 Method and Apparatus for Automated Authoring and Marketing, which is incorporated by reference) or serve in place of the Principal Person 102 at a memorial service or at subsequent anniversaries or on special occasions.

It will be apparent, however, to one skilled in the art, that the framework described may be practiced using only voice communication or text communication and or more broadly for expertise in various domains. For example, a business may wish to deploy the expertise of one of its employees to several remote location simultaneously interactively or in the form of a manual or multimedia-based expert system.

Figure 2:
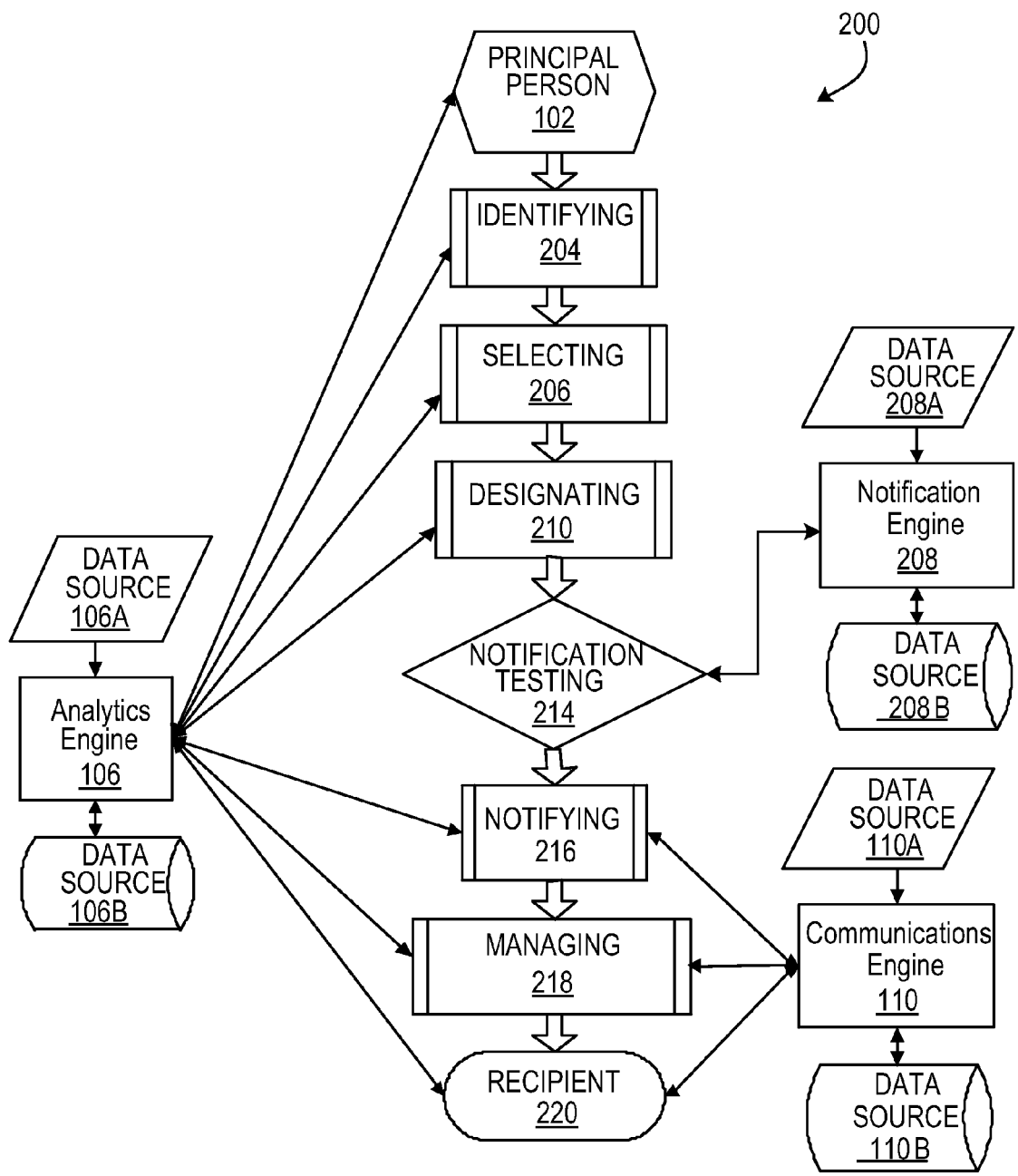
FIG. 2 is a flowchart for imparting advance directives to a intelligent surrogate for execution at a future time.

FIG. 2 shows the conceptual framework 200 for the entering and execution of advance directives for future actions. The Principal Person 102 logs in to his account for Identification 204, to access identification information and all the information known or inferred by the Analytic Module that has been collected, organized and transformed into an intelligent personal assistant that can act as a Surrogate when the Principal Person 102 becomes incompetent. The advance directives enable the system acting as the Surrogate of the Principal Person to compose and deliver messages, to purchase gifts and arrange for their delivery to living persons specifically identifiable at the time the directives were entered or to persons unborn or not yet part of the social network; and to convene and organize social gatherings to similarly chosen guests. The Principal Person 102 initiates directives with a process of Selection 206 of the occasion or event chosen from a set provided by the Analytic Module 106. then a Designation 210 of the person or persons to be contacted and using the Notification Module specifies a future date of Notification 214 or a means to determine a future date to be notified. When the system detects the said date has occurred the Communication Module 110 aided by Analytic Module 106 initiated a Notification 216 of the person or person previously selected and manage carrying out the directives 218. For example the system with the aid of the Analytic Module 106 which can access an ontology of future time, can determine the birthday of selected individuals, analyze with the aid of the Communication Module 110 their preferences from their profiles then contact a vendor for a suitable gift and arrange for its delivery. In some embodiments, the Analytics Engine acts as a surrogate of a Principal Person 102 to generate responses (e.g., messages, and/or delivery instructions) based on historical data specific to the Recipient 220. For instance, the Analytics Engine may be configured as described by Gruber et al. (U.S. patent application Ser. No. 12/987,982, filed Jan. 10, 2011, the contents of which are incorporated herein by reference) and by Basea-Forte et al U.S. patent application Ser. No. 13/492,809 to include an automated assistant receiving user input; an active ontology with representations of concepts and relations among concepts drawn from various databases of historical; and a language interpreter parsing the publisher user input to derive a representation of Principal Person's intent in terms of the active ontology together with a services orchestration to output responses and instructions to implement the Principal Person's intent.

It will be apparent, however, to one skilled in the art, that the framework described may be practiced for more than communicating multimedia messages at future times, delivering gifts to relatives or friends on future occasions, or organizing future meetings and presentations. For example, a business in the event of an emergency may wish to deploy the expertise of one of its employees to several remote locations simultaneously interactively or in the form of a manual or multimedia-based expert system.

Figure 3:
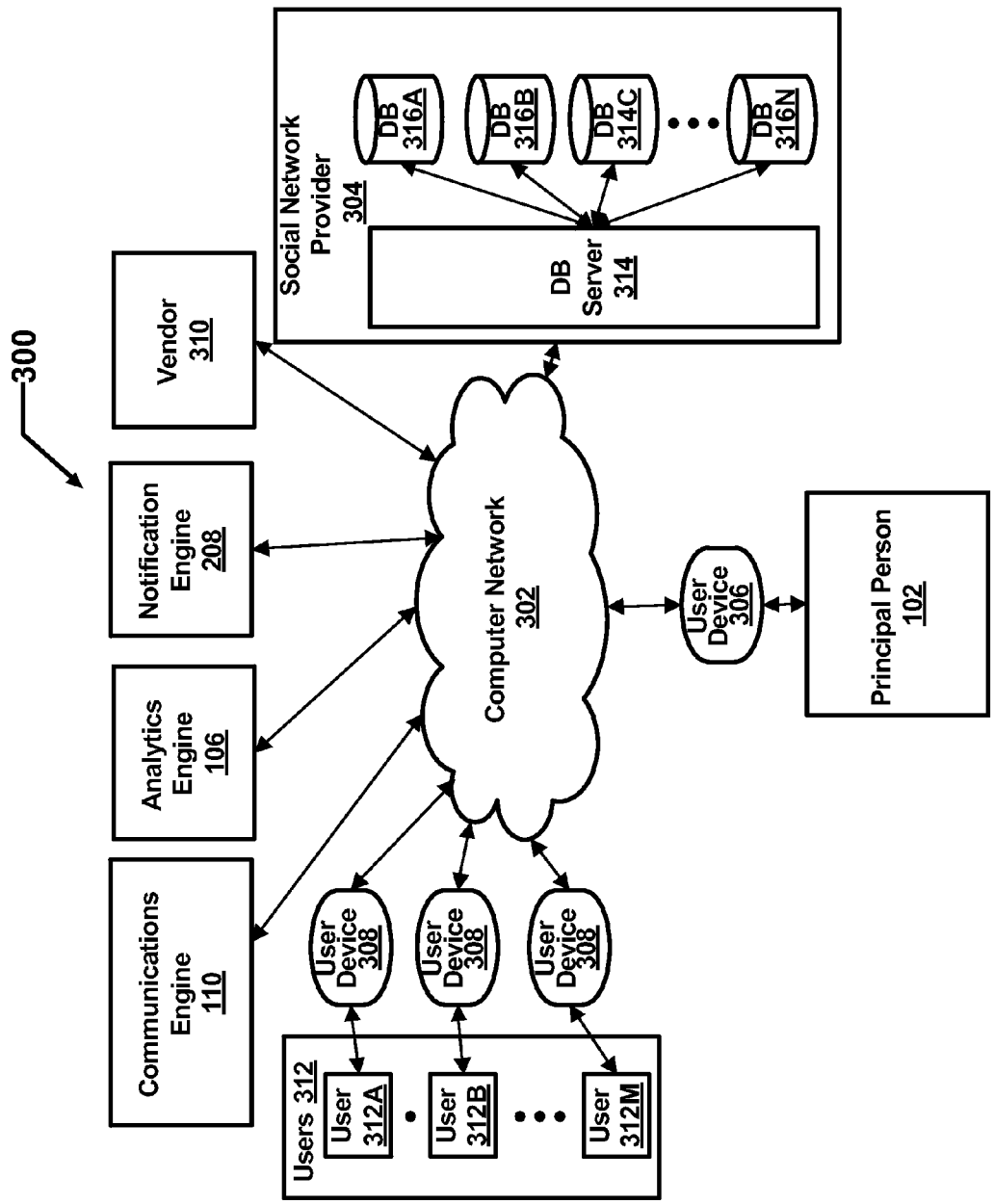
FIG. 3 is a block diagram of a social network or other system.

FIG. 3 is an exemplary configuration of a system 300 for embodiment of the present invention. The Principal Person 102 by means of his computing device 306, which is connected to the Internet 302, is enabled to generate a representational Surrogate imbued with his personal knowledge and capable of discerning his intent for executing directives for future actions. The Internet 302 further connects to the Analytic Engine 106, the Communication Engine 110, the Notification Engine 208 and the services of a Vendor 310. These engines and services draw up internet-accessible databases on the network 304, which include the data and relationship supporting the lifetime ontology of the Principal Person 102 as well as the present and future ontologies in which the directives of the Principal Person 102 will be carried out. The communications, interactive presentations and directives of the Principal Person 102 are targeted at internet-enabled Recipients 312.

Figure 4:
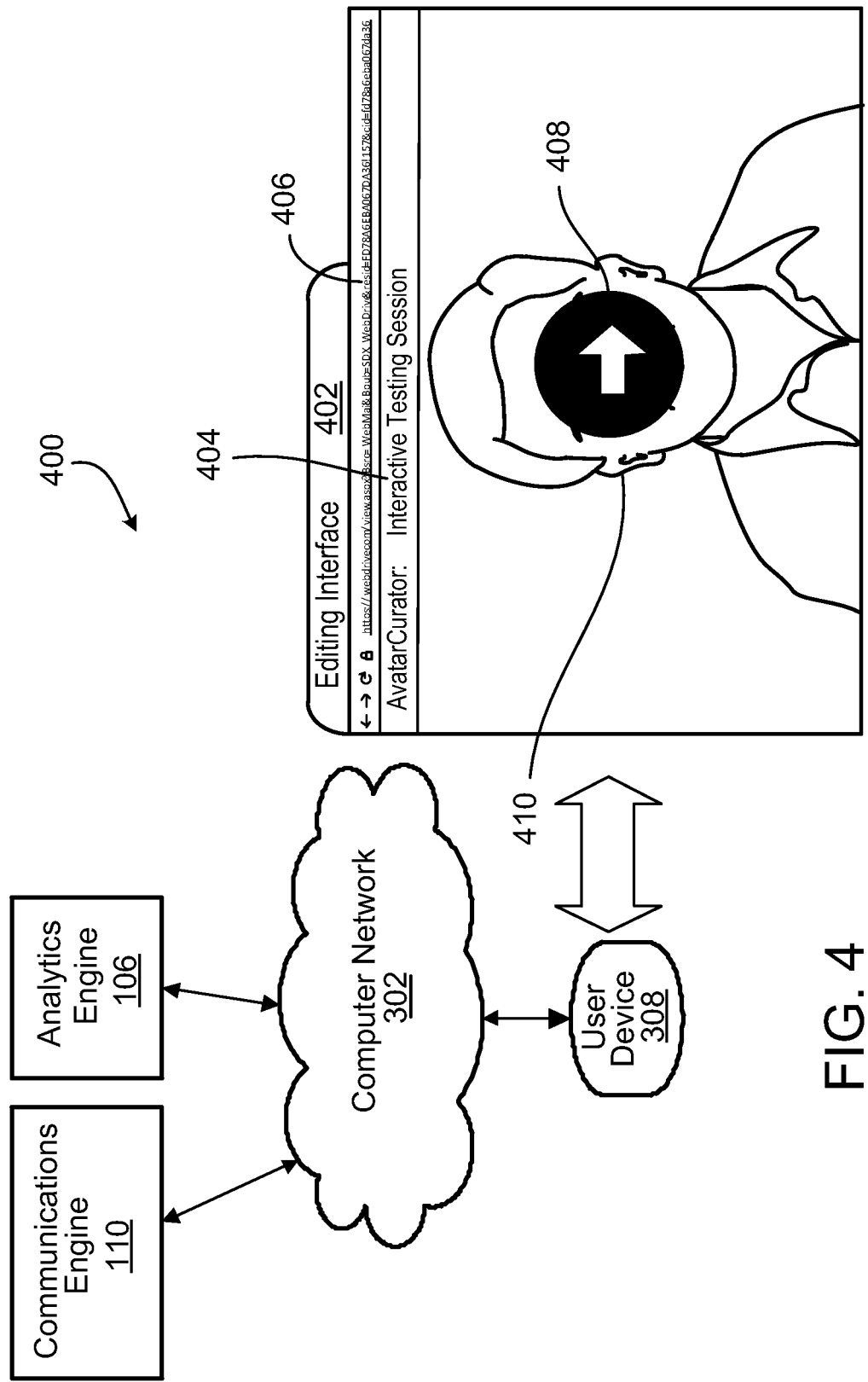
FIG. 4 is a view of an editing interface for avatar construction and surrogate development.

FIG. 4 shows an exemplary embodiment of the Editing Interface 400 presented to the Principal Person 102. The internet-accessible computing device 402 is a means of presenting an Avatar 410, which can be the interrogating avatar for interactively collecting life history information from the Principal Person 102 or the avatar of the Principal Person to testing determine if the system surrogate has met a predetermined criterion of correctness. The Window Title 404 indicates the stage of surrogate development. The website URL is noted by 406. The video start button 408 can be clicked or commanded verbally to start the sessions. When the system surrogate has met the predetermined criterion of correctness the Principal Person 102 can proceed to set up directives future actions.

Figure 5:
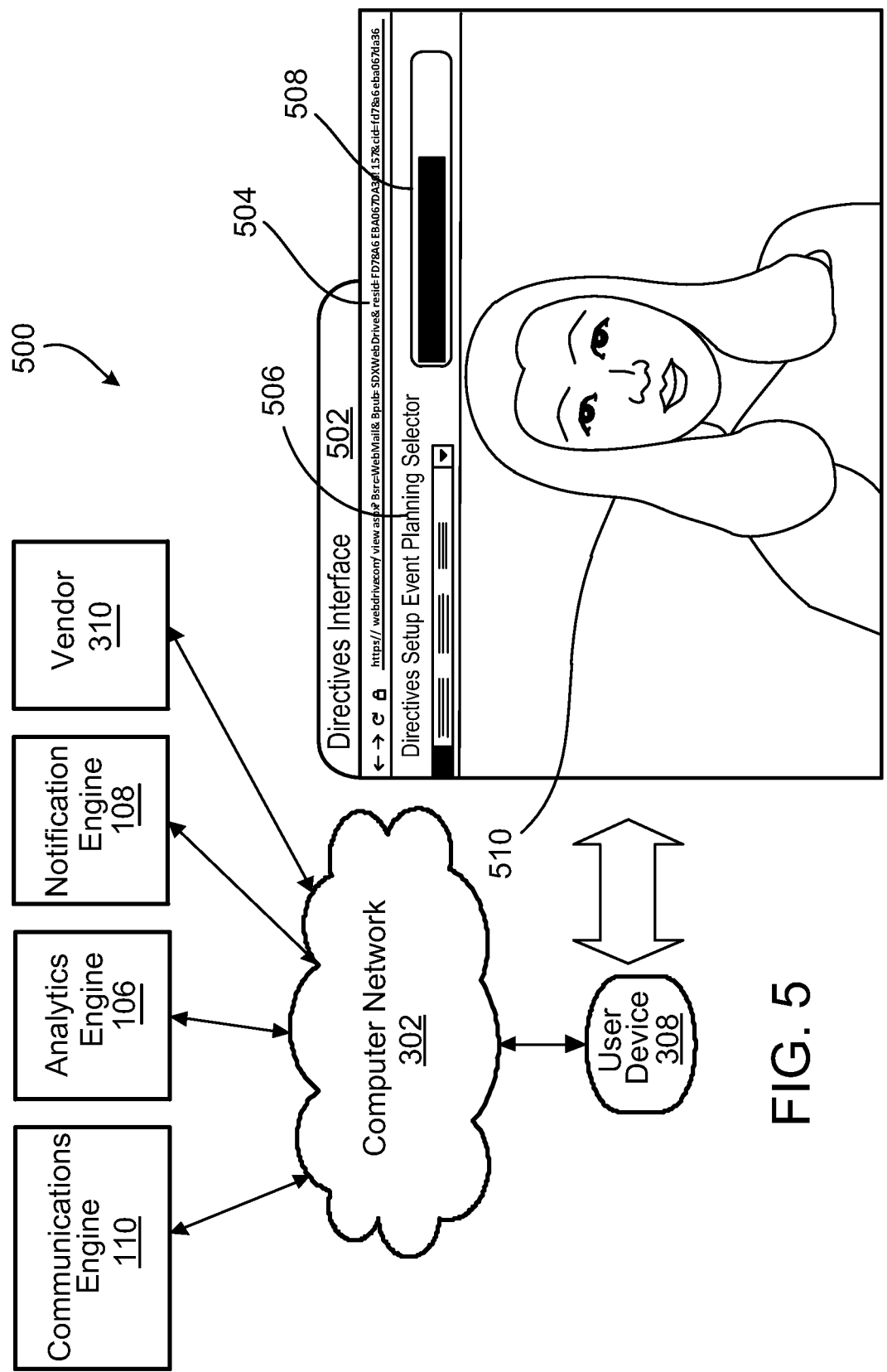
FIG. 5 is a view of an editing interface for entering surrogate directives.
Figure 6:
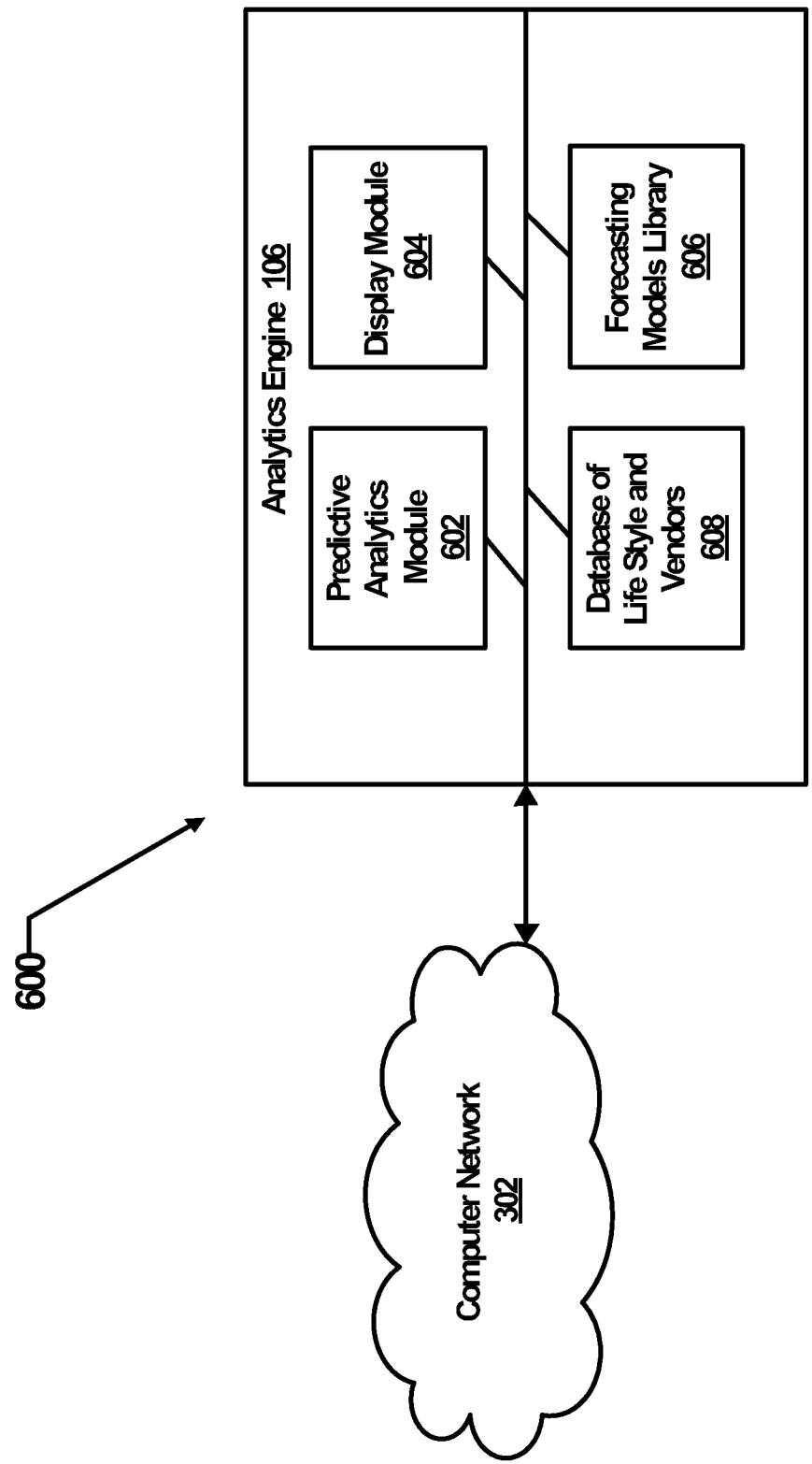
FIG. 6 is a block diagram of an Analytics Engine.

FIG. 5 is a view of an editing interface 500 for entering surrogate directives. The internet-accessible computing device 502 is a means of presenting an Avatar of 510 to receive instructions by natural language dialog for executing future actions. The Windows title 506 indicates the type of directive being edited. The website URL is indicated by 504. A progress bar 508 indicates the steps completed and still to be completed FIG. 6 is a block diagram of the Analytics Engine 106 of the system 300. The Analytics Engine 106 facilitates identifying notification trigger events for significant event persons, curating an appropriate message upon notification, then publishing or delivery of communications in response to a significant event on behalf of Principal Person 102 by inferring information about the person described in the communication item from one or more data sources or determining or inferring milestone events for the recipient user 314 or for the person described in the communication item, among other things. The person described in the communication item may be the intended reader of the communication item, the publisher of the communication item, both the reader and the publisher, or neither the reader nor the publisher.

A predictive analytics module 602 in Analytics Engine 106 applies search algorithms and forecasting models stored in a search and forecasting models library 606 to analyze present and/or historical subject user data in view of data stored in a database 608 containing data related to identify milestone events and to suggest appropriate media messages or items for a reader user. The predictive analytics module 602 implements a variety of forecasting techniques beyond simple algorithms, such as future date calculation, including statistical techniques such as machine learning (e.g., as applied by IBM's Watson computer), game theory, and data mining, to analyze current and historical data to determine significant event triggers for notification, to make predictions about future readers, to identify communication media messages, and to identify appropriate delivery times and methods, among a wide variety of other analyses and algorithms. For example in the case of an autobiographical communication item of a grandfather (the publisher user), the reader user is the projected offspring of a current member in the system but the publisher user may incapacitated at the time of publication and delivery or both. By a computer-implemented method, data relevant to the publisher user may be extracted from his profile in the system 300 and/or generated implicitly based, at least in part, on the publisher user's stored profile together with historical data by a predictive analytics algorithm based on historical data. Based on the extracted or generated data, a significant event is identified, content for a communication is selected, appropriate reader users are identified, and/or other analysis is performed, in some cases without input from the publisher user.

In some examples, Analytics Engine 106 may use data specific to a user to identify potential milestone events (e.g., to identify a bar mitzvah date for a child based on the child's birth date or to identify appropriate religious holidays based on the user's specified religious affiliation or a prevailing religion in the region where the user lives). In some cases, the predictive analytics module 602 may also incorporate present or historical data or both to identify relevant information for the communication subject or reader user or both that are in keeping with preferences of the publisher user. In other examples, the Analytics Engine 106 analyzes publically available sources of information and/or private sources of information to which it has access, including, e.g., social networking facilities, online or mobile periodicals such as newspapers or magazines, and websites, to identify the occurrence of significant events associated with the reader user or with the person whom the communication is about. For instance, the Analytics Engine 106 may analyze trade journal websites to set up criteria so the Notification Engine 208 can identify when a target person receives an award or a promotion.

A display module 504 of the Analytics Engine 106 may display the significant events of an individual of interest a reader user or another individual specified by the publisher user) on a webpage belonging to or accessible by the publisher user. These events with associated actions can be selected for notifications stored in the Notification Engine 208. In some embodiments, upon notification by the Notification Engine, the Analytics Engine 106 may automatically communicate messages of a significant event relevant to a reader user, such as a birthday, to the Communication Engine 110, which sends the notices to relatives of the reader user, who can act as publisher users. The Analytics Engine 106 may use information about a reader user found in various databases to determine when to send out the notices.

In some embodiments, the predictive analytics implemented by the Analytics Engine 106 incorporate the robust, optimizing forecasting techniques of Pinto et al. (U.S. Pat. No. 7,499,897, issued on Mar. 3, 2009; U.S. Pat. No. 7,562,058, issued on Jul. 14, 2009; U.S. Pat. No. 7,725,300, issued on May 25, 2010; U.S. Pat. No. 7,730,003, issued on Jun. 1, 2010; U.S. Pat. No. 7,933,762, issued on Apr. 26, 2011; U.S. Pat. No. 8,165,853, issued Apr. 24, 2012; U.S. Pat. No. 8,170,841, issued May 1, 2012; and U.S. patent application Ser. No. 10/826,949, filed Apr. 16, 2004, the contents of all of which are incorporated herein by reference), that manage historical data using missing values, which must be inferred.

The Analytics Engine 106 can act as a surrogate for the Principal Person 102 by specifying communications, goods, and services or any other communication items for placement into storage. Provided the potential reader user 314 is registered in the system 300, the Communication Engine 110 will determine the location of the reader user, e.g., by GPS tracking or similar means. The reader user's interests and status may be available in the reader user's profile, which, taken together with historical data, enable the Analytics Engine 106 utilizing inferences from missing data, if necessary, to determine an appropriate gift to accompany the message and an optimal time for delivery. The delivery time is selected by a predictive analytics algorithm, based on historical data specific to the reader user.

In some embodiments, the Analytics Engine 106 acts as a surrogate of a Principal Person 102 to generate communication items (e.g., messages, sympathy tribute selections, and/or delivery instructions) based on data, e.g., historical data, specific to the reader user. For instance, the Analytics Engine may be configured as described by Gruber et al. (U.S. patent application Ser. No. 12/987,982, filed Jan. 10, 2011, the contents of which are incorporated herein by reference) to include an automated assistant receiving user input; an active ontology with representations of concepts and relations among concepts drawn from various databases of historical data (for instance, for the case in which the publisher user is the agent of a corporation, the corporate personnel database may be referenced); and a language interpreter parsing the publisher user input to derive a representation of publisher user intent in terms of the active ontology together with a services orchestration to output responses and instructions to implement the publisher user's intent. By a computer-implemented method, data relevant to the reader user may be extracted from his profile, generated implicitly based, at least in part, on the reader user's stored profile with the system together with historical data by a predictive analytics algorithm based on historical data, and/or obtained from publically available or privately accessible information sources. Based on the extracted or generated data a communication is selected, generated, and delivered, in some cases without input from the publisher user.

Figure 7:
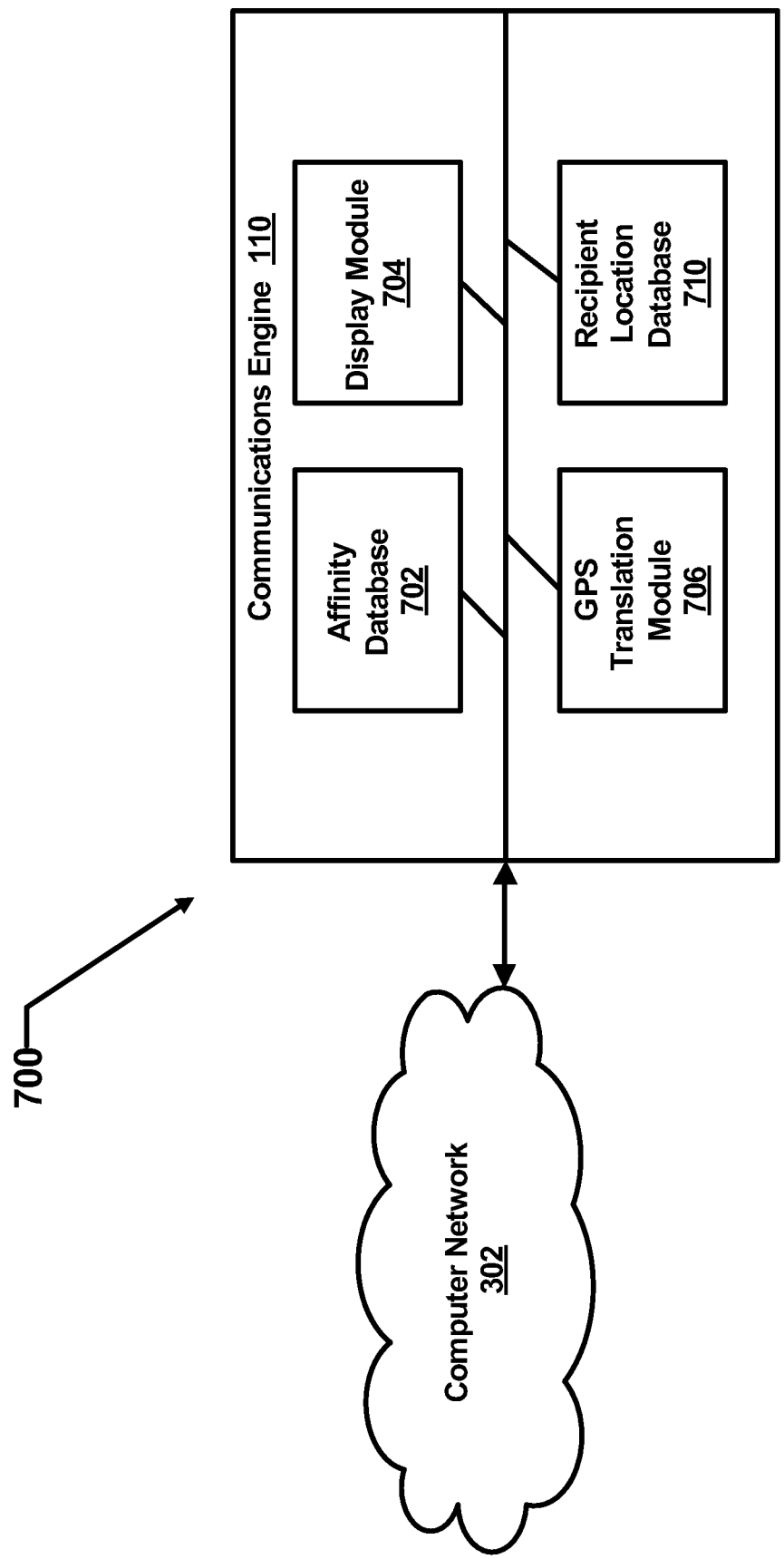
FIG. 7 is a block diagram of a Communication Engine.

FIG. 7 is a block diagram 700 of a Communication Engine 110 of the system 300. The Communication Engine 110 facilitates identification of a significant event person along with criteria used by the Notification Engine 208 to trigger notification of the curator for composing a message, publishing or delivery of communication items) for a Principal Person 102 by providing, information about a reader user's physical location, profile interest information, and/or affinity information. In some examples, the location, interest, and affinity and other current and historical information may be displayed by a display module 704 on a webpage belonging to or accessible by the publisher user. The communication engine 110 includes a affinity database 702 for storing significant event person and reader user affinity information and a reader location database 710 for storing the physical location of a reader user. The reader location database 710 may receive data relevant to the location of a reader user from a GPS translation module 706 or may obtain the reader user's location from the Analysis Engine's analysis of websites or other sources of information. For example, the publisher user may have composed a sympathy note regarding an individual killed in an accident; the Communication engine determines that the next of kin is traveling in another country and thus likely to be reachable by email but not by phone.

Figure 8:
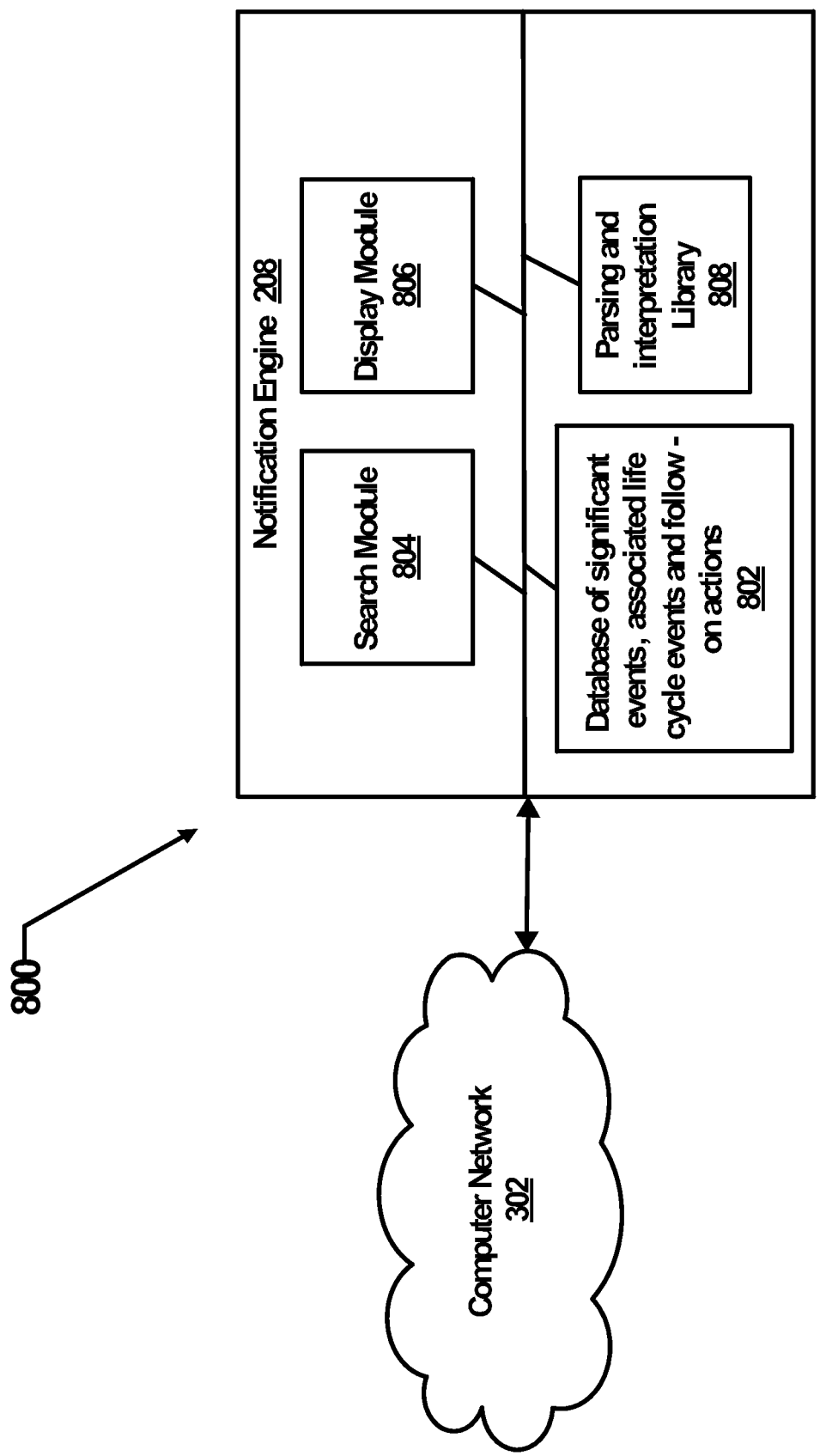
FIG. 8 is a block diagram of a Notification Engine.

FIG. 8 is a block diagram 800 of a Notification Engine 208 of the system 300. The Notification Engine 208 facilitates publishing or delivery of communications for a Principal Person 102 by detecting significant events of interest to the Principal Person 102 as listed in a data file 802. For example, a publisher user may be notified about the death of friend by means of a search module 804 supported by a parsing and interpretation library 808. The publisher user may then compose and publisher or deliver a sympathy message to the friend's family. In some examples, information the individual whose significant event has been detected (referred to here as the tracked individual) may be displayed by a display module 806 on a webpage belonging to the publisher user. The Notification Engine 108 may also display the tracked individual's profile within the system 300 for confirmation of the individual's significant event.

Figure 9:
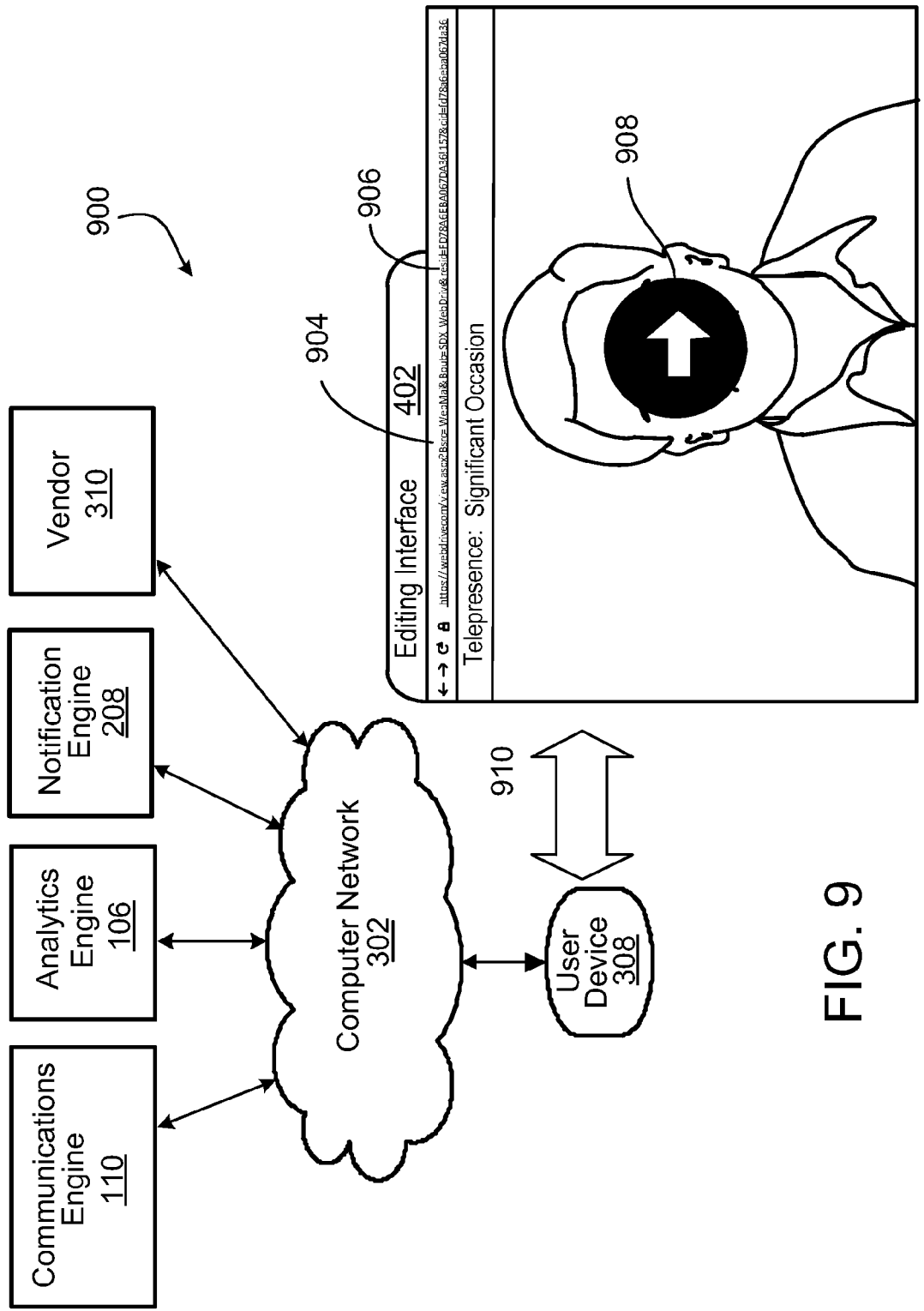
FIG. 9 is a view of the recipient interface.

FIG. 9 is a view 900 of a recipient interface. The internet-connected computing device 902 enables a multimedia display that shows an Avatar of the Principal Person 910 programmed to deliver answers to natural language inquiries using the detailed knowledge of the Principal Person 102 previously collected, curated and transformed.

Figure 10:
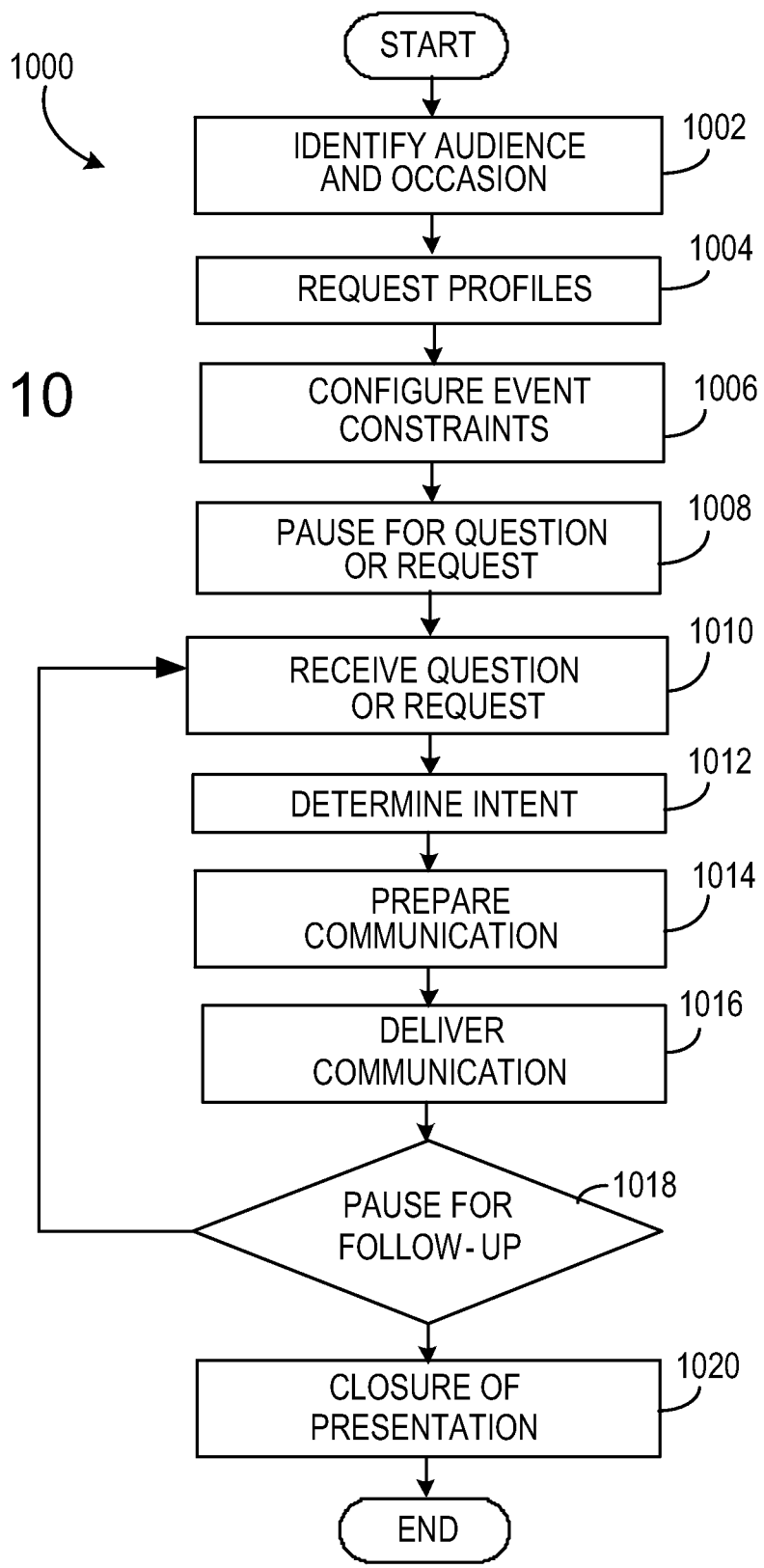
FIG. 10 is a flowchart for delivering presentations.

FIG. 10 is a flowchart of an example process 10001 for communicating a multimedia message in the system 300. In the process 1000, a Principal Person 102 has directed his surrogate with an occasion and an specific audience (Step 1002). The Surrogate using the Communication Engine (110) requests the profiles of the audience members (Step 1004). The Analytic Engine then provides event constraints for the communication (Step 1006). Using the Notification Engine 208 there is a pause for the first question of request (Step 1008). When the question or request is received the intent is determined by the Analytic Engine (Step 1012) and the response is prepared (Step 1014). The Communication Engine using the Surrogate Avatar delivers the communication (Step 1016). Then there is a pause for follow-up (Step 1018) and the cycle repeats until the Notification Engine 208 determines the presentation is complete. Then there is a closure of the presentation (Step 1020). The audience may be given the opportunity to acknowledge receipt and confirm delivery and even reply to the Principal Person 102 or to his proxy.

Figure 11:
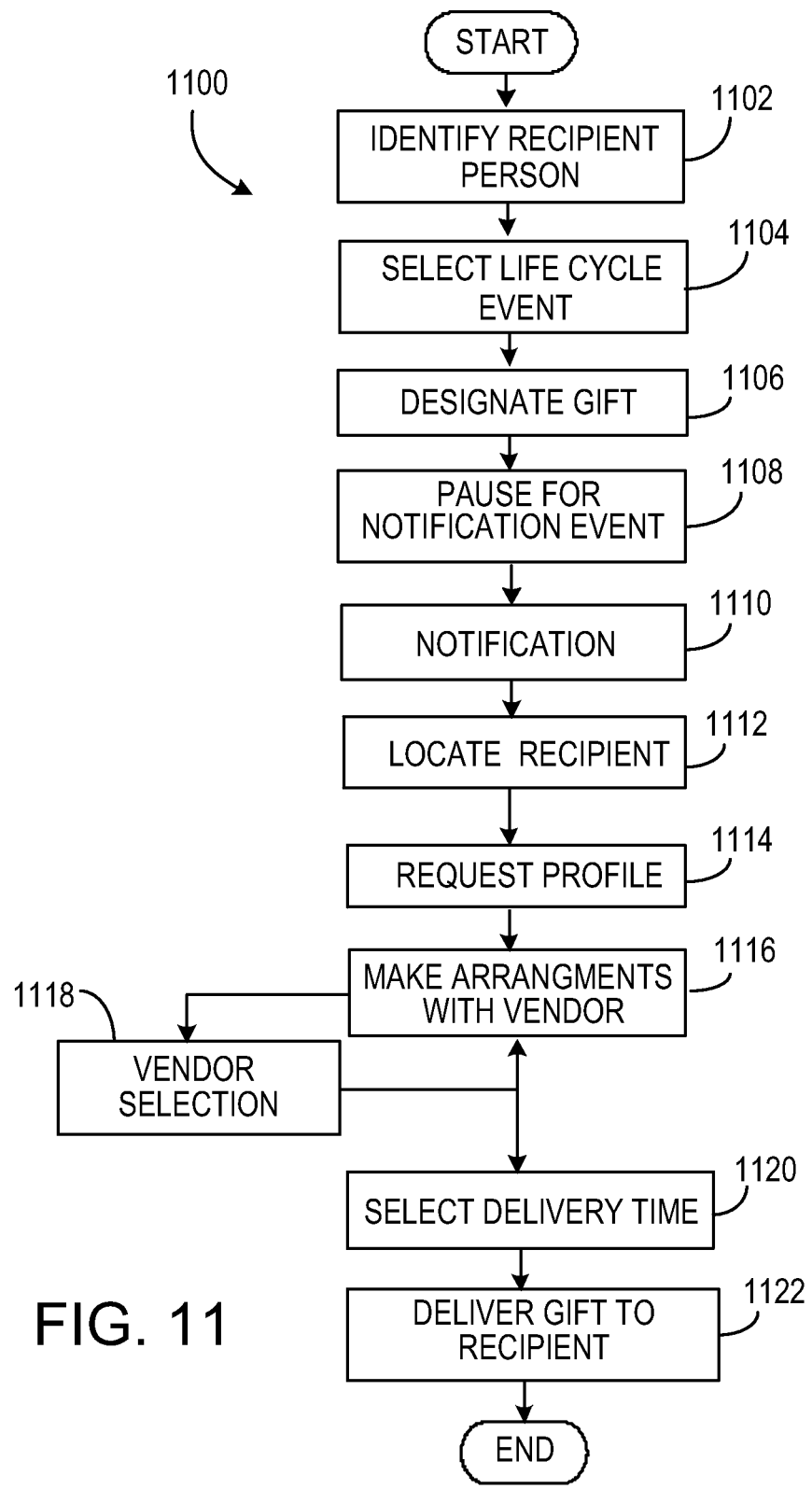
FIG. 11 is flowchart for delivering gifts.

FIG. 11 is a flowchart of an example process 1100 for distributing a gift or tribute in the system 300. In the process 1100, a Principal Person 102 has selected or set up a directive to select a recipient person (Step 1102) and a particular life cycle event (Step 1104) and using the communication engine for profile of the person and analytic engine for predictive forecasting a gift or tribute is chosen (Step 1106). Then there is a pause (Step 1108) but at the appropriate date as determined by the notification engine (208) (Step 1110) the recipient is located by means of the communication engine (110) (Step 1112) using the current recipient profile for location (Step 1114). Under the directives the system makes arrangement with a vendor (Step 1116) using the analytics engine (106) for vendor selection (Step 1118) and delivery time selection (1120). The gift vendor or another vendor then delivers the gift to the recipient (Step 1122). The recipient 314D may be given the opportunity to acknowledge receipt and confirm delivery and to reply to the Principal Person 102 or the publisher user's proxy.

FIG. 12 shows a flowchart 1200 of the management of an advance event directive planned by the Principal Person 102 The Principal Person selects the type of event to host (Step 1202) and selects the attendees either directly (Step 1204) or by description using profiles if available (Step 1206). The Principal Person 102 then sets the date of the event or some triggering criterion, e.g., birthday party or graduation party (Step 1208) and the venue directly or by description, e.g., function room at Waldorf Astoria in New York (Step 1212). Based on the guest's profiles, the Proxy Surrogate selects the menu and caterer which may be the regular venue caterer (Step 1214), in advance of the appropriate date or immediately after notice of the triggering event, the Proxy Surrogate of the Principal Person sends out the invitations (Step 1216) using a service such as EventBrite™ to collect RSVPs (Step 1220) then confirms the appropriate venue and catering arrangements (Step 1222). Then the Proxy Surrogate arranges for an Internet-accessible telepresence display (Step 1224). On the date of the event, the Proxy Surrogate use the telepresence display to attend the event and greet the attendees and during the event the Proxy Surrogate interacts with attendees. At the end of the end the Proxy Surrogate thanks the attendees, coordinates with the caterer and venue provider and shuts off the telepresence display.

As desired, the life cycle event social network may include more or fewer than the components illustrated.

The life cycle event social network is described above with reference to block and flow diagrams of systems, methods, apparatuses, and/or computer program products according to examples. In some instances, the publisher and reader users may access the social network by desktop or laptop computers. In some embodiments, the publisher and reader users may access the social network by mobile devices such as smart phones. In some embodiments, the publisher and reader users may access the social network by tablet computers or any commercial computing device connected to the internet. In some cases, the social network may be constructed to operate on the interact independent of existing social networks. The life cycle event social network may operate using existing social networks, e.g., Facebook, Google+, or Yammer as platforms using existing application interfaces open to website developers.

Generally, the intelligent automated assistant techniques disclosed herein may be implemented on hardware or a combination of software and hardware. For example, they may be implemented in an operating system kernel, in a separate user process, in a library package bound into network applications, on a specially constructed machine, or on a network interface card. In a specific embodiment, the techniques disclosed herein may be implemented in software such as an operating system or in an application running on an operating system.

Software/hardware hybrid implementation(s) of at least some of the intelligent automated assistant embodiment(s) disclosed herein may be implemented on a programmable machine selectively activated or reconfigured by a computer program stored in memory. Such network devices may have multiple network interfaces which may be configured or designed to utilize different types of network communication protocols. A general architecture for some of these machines may appear from the descriptions disclosed herein. According to specific embodiments, at least some of the features and/or functionalities of the various intelligent automated assistant embodiments disclosed herein may be implemented on one or more general-purpose network host machines such as an end-user computer system, computer, network server or server system, mobile computing device (e.g., personal digital assistant, mobile phone, smartphone, laptop, tablet computer, or the like), consumer electronic device, music player, or any other suitable electronic device, router, switch, or the like, or any combination thereof. In at least some embodiments, at least some of the features and/or functionalities of the various intelligent automated assistant embodiments disclosed herein may be implemented in one or more virtualized computing environments (e.g., network computing clouds, or the like).

One or more blocks of the block diagrams and flow diagrams, and combinations of blocks in the block diagrams and flow diagrams, respectively, can be implemented by computer-executable program instructions. Some blocks of the block diagrams and flow diagrams may not necessarily need to be performed in the order presented, or may not necessarily need to be performed at all, in some cases.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement, one or more functions specified in the flow diagram block or blocks. As an example, embodiments may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that, perform the specified functions, elements or steps, or combinations of special purpose hardware and computer instructions.

While the life cycle event social network has been described in connection with certain examples, is the system is not limited to the disclosed embodiments, but on the contrary, includes various modifications and equivalent arrangements. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially generated propagated signal, e.g., machine-generated electrical, optical, or electromagnetic signal that is generated to encode for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., ara FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or communication data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a use by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Other implementations are also within the scope of the following claims.

What is claimed is:

1. A method comprising:
maintaining information characterizing one or more of an appearance, a voice, or a behavior of a person;
receiving information indicative of (a) content that is to be part of a message to be delivered to a recipient on behalf of the person, (b) a relationship between the person and the recipient, and (c) a delivery time for delivery of the message, in which the content, the delivery time, or both are not present in the received information;
inferring one or more of (i) the content based on the received information indicative of the content, including inferring at least some of the content at the delivery time, (ii) an identity of the recipient based on the received information indicative of the relationship between the person and the recipient, or (iii) the delivery time based on the received information indicative of the delivery time; and
delivering the message to the recipient at the delivery time on behalf of the person, the message including the content, the delivering including providing a customized natural language response to an input received from the recipient, the providing of the response comprising using a digital representation of the person generated based on one or more of the appearance, the voice, or the behavior of the person.

2. The method of claim 1, in which delivering the message includes delivering a multimedia message.

3. The method of claim 1, comprising generating the digital representation of the person based on one or more of the appearance, the voice, or the behavior of the person.

4. The method of claim 1, in which the digital representation of the person includes a representation of one or more of the following: the voice of the person, the behavior of the person, or the appearance of the person.

5. The method of claim 1, in which providing a customized natural language response includes responding to a question or statement from the recipient.

6. The method of claim 5, in which providing a customized natural language response to the input received from the recipient includes forming a response to the question or statement based on one or more of (a) one or more of the appearance of the person, the voice of the person, or the behavior of the person, (b) information about a time period during which the person lived, or (c) autobiographical information about the person.

7. The method of claim 1, comprising generating the message based on (a) the information characterizing the appearance, the voice, or the behavior of the person, (b) the information indicative of the content that is to be part of the message, or (c) both (a) and (b).

8. The method of claim 1, in which receiving the information indicative of an identity of the recipient includes receiving a specification of the identity of the recipient.

9. The method of claim 1, in which receiving the information indicative of the delivery time includes receiving a specification of the delivery time.

10. The method of claim 1, in which receiving the information indicative of the delivery time includes receiving an identification of an event.

11. The method of claim 1, in which receiving the information indicative of the delivery time includes receiving a definition of a condition for occurrence of an event.

12. The method of claim 1, in which receiving the information indicative of the content that is to be part of the message includes receiving a specification of the content that is to be part of the message.

13. The method of claim 1, in which receiving the content that is to be part of the message includes receiving autobiographical information about the person.

14. The method of claim 1, comprising receiving information indicative of a manner of delivery of the message.

15. The method of claim 1, in which delivering the message to the recipient includes delivering the message when the person is not alive or not competent.

16. The method of claim 1, in which receiving the information indicative of the content that is to be part of the message, the identity of the recipient, and the delivery time includes receiving the information when the recipient is not alive or not competent.

17. The method of claim 1, comprising receiving at least some of the information characterizing one or more of the appearance, the voice, or the behavior of the person from the person.

18. The method of claim 17, in which receiving the information characterizing one or more of the appearance, the voice, or the behavior of the person comprises: presenting a question to the person and receiving an answer to the question from the person.

19. The method of claim 17, in which receiving the information characterizing one or more of the appearance, the voice, or the behavior of the person includes conducting a natural language interaction with the person.

20. The method of claim 1, comprising conducting an automated analysis of publicly available online information to obtain at least some of the information characterizing one or more of the appearance, the voice, or the behavior of the person.

21. The method of claim 1, comprising maintaining information about a time period during which the person lived, and in which providing the customized natural language response includes providing the customized natural language response based on the information about the time period during which the person lived.

22. The method of claim 1, comprising maintaining autobiographical information about the person, and in which providing the customized natural language response includes providing the customized natural language response based on the autobiographical information about the person.

23. The method of claim 1, comprising receiving the input from the recipient.

24. The method of claim 23, comprising delivering a portion of the message to the recipient prior to receiving the input from the recipient.

25. The method of claim 1, in which the customized natural language response comprises a response that is prepared specifically for the recipient.

26. The method of claim 1, in which the customized natural language response comprises a response that is prepared specifically in response to a question, statement, or request by the recipient.

27. The method of claim 1, in which one or more of the content, the identity of the recipient, or the delivery time are inferred based at least in part on results of an automated analysis of publicly available online information.

28. A method comprising:
receiving (a) information characterizing one or more of an appearance, a voice, or a behavior of a person and (b) information indicative of a relationship between the person and a recipient;
inferring an identity of the recipient based on the received information indicative of the relationship between the person and the recipient; and
providing a customized natural language response to an input received from the recipient, the providing of the response comprising using a digital representation of the person that is generated based on one or more of the appearance, the voice, or the behavior of the person,
in which the person is not alive or not competent when the natural language interaction is conducted.

29. The method of claim 28, in which providing the natural language response includes generating the natural language response based on one or more of (a) one or more of the appearance, the voice, or the behavior of the person, (b) information about a time period during which the person lived, or (c) autobiographical information about the person.

30. The method of claim 28, comprising determining a context of the natural language response based on one or more of (a) one or more of the appearance, the voice, or the behavior of the person, (b) information about a time period during which the person lived, or (c) autobiographical information about the person.

31. The method of claim 30, in which the context of the natural language response includes a time at which the natural language response is to be provided, a style of the natural language response, or both.

32. The method of claim 28, comprising determining a content of the natural language response based on one or more of (a) one or more of the appearance, the voice, or the behavior of the person, (b) information about a time period during which the person lived, or (c) autobiographical information about the person.

33. The method of claim 32, in which the content of the natural language response includes autobiographical information about the person.

34. The method of claim 28, in which the digital representation of the person includes a representation of one or more of the following: the voice of the person, the behavior of the person, or the appearance of the person.

35. The method of claim 28, comprising receiving the input from the recipient.

36. The method of claim 28, comprising receiving the information indicative of the identity of the recipient when the recipient is not alive or not competent.

37. A system comprising:
a storage device for maintaining information characterizing one or more of an appearance, a voice, or a behavior of a person; and
an analytics engine for:
receiving information indicative of (a) content that is to be part of a message to be delivered to a recipient on behalf of the person, (b) a relationship between the person and the recipient, and (c) a delivery time for delivery of the message, in which the content, the delivery time, or both are not present in the received information,
inferring one or more of (i) the content based on the received information indicative of the content, including inferring at least some of the content at the delivery time, (ii) an identity of the recipient based on the received information indicative of the relationship between the person and the recipient, or (iii) the delivery time based on the received information indicative of the delivery time, and
delivering the message to the recipient at the delivery time on behalf of the person, the message including the content, the analytics engine configured to provide a customized natural language response to an input received from the recipient, the providing of the response comprising using a digital representation of the person generated based on one or more of the appearance, the voice, or the behavior of the person.

38. The system of claim 37, in which the analytics engine is configured to generate the digital representation of the person for display on a user interface.

39. The system of claim 37, in which providing a natural language response to an input received from the recipient includes responding to a question or statement from the recipient.

40. A system comprising:
a communication engine for receiving (a) information characterizing one or more of an appearance, a voice, or a behavior of a person and (b) information indicative of a relationship between the person and a recipient; and
an analytics engine for:
inferring the identity of the recipient based on the received information indicative of the relationship between the person and the recipient, and
providing a customized natural language response to an input received from the recipient, the providing of the response comprising using a digital representation of the person that is generated based on one or more of the appearance, the voice, or the behavior of the person,
in which the person is not alive or not competent when the natural language interaction is conducted.

41. The system of claim 40, in which the analytics engine is configured to generate the digital representation of the person for display on a user interface.

42. A method comprising
receiving information from which at least one of the following can be derived: content of a message to be delivered from a first party to a second party about a life event, a manner of delivery of the message, a future time when the message is to be delivered, or the identity of the second party, in which the received information includes information indicative of a relationship between the first party and the second party, in which the content, the future time, or both are not present in the received information,
inferring one or more of the content, the manner of delivery, the future time, or the identity of the second party based at least in part on at least some of the received information, including inferring the identity of the second party based on the received information indicative of the relationship between the first party and the second party,
automatically on behalf of the first party, forming, based on the received information and one or more of the inferred content or the inferred manner of delivery, an integrated, conversational multimedia message that is to be part of a customized natural language dialog with the second party.

43. The method of claim 42, in which the integrated, conversational multimedia message is automatically formed by an intelligent proxy on behalf of the first party.

44. The method of claim 42, in which the integrated, conversational multimedia messages is formed to be responsive to natural language communication received from the second party.

45. The method of claim 43, in which the intelligent proxy enables a user to interact with online services to obtain information related to the message.

46. The method of claim 42, in which the automatic forming of the message comprises imbuing a digital surrogate with qualities associated with the first party, the manner of delivery of the message, the time of delivery of the message, or the second party.

47. The method of claim 42, comprising receiving the information interactively.

48. The method of claim 47, comprising receiving the information by an interrogation avatar.

49. The method of claim 42, comprising receiving the information the form of one or more of images, video, voice, or behavioral gestures of the first party.

50. The method of claim 42, comprising forming the message in response to a conventionally asked question from the second party.

51. The method of claim 42, in which the customized natural language dialog comprises an interactive obituary or a digitized life history of the first party.

52. A method comprising
maintaining digital information that enables the formation of an interactive digital surrogate of an originating person based on digital audio or video information derived from the originating person,
inferring an identity of a receiving person based at least in part on information provided by the originating person, the information indicative of a relationship between the originating person and the receiving person, and
at a time when the originating person is not alive or otherwise not available, causing the digital surrogate to engage in a customized natural language dialog with the receiving person.

53. The method of claim 52, in which the context of the natural language dialog is determined based on information that had been provided by the originating person.

54. The method of claim 53 in which the context comprises the time of the natural language dialog or the style of the natural language dialog.

55. A method comprising:
maintaining information characterizing one or more of an appearance, a voice, or a behavior of a person;
receiving information indicative of (a) a relationship between the person and a recipient and (b) a delivery time for delivery of a message to be delivered to the recipient on behalf of the person, in which the delivery time is not present in the received information;
inferring one or more of (i) an identity of the recipient based on the received information indicative of the relationship between the person and the recipient or (ii) the delivery time based on the received information indicative of the delivery time; and
delivering the message to the recipient at the delivery time on behalf of the person, the delivering including providing a customized natural language response to an input received from the recipient, the natural language response comprising a digital representation of the person based on at least some of the information characterizing one or more of the appearance, the voice, or the behavior of the person.

* * * * *